US010956695B2

(12) United States Patent
Stang et al.

(10) Patent No.: US 10,956,695 B2
(45) **Date of Patent: *Mar. 23, 2021**

(54) INDICIA READER ACOUSTIC FOR MULTIPLE MOUNTING POSITIONS

(71) Applicant: Hand Held Products, Inc., Fort Mill, SC (US)

(72) Inventors: Jean-Pierre Stang, Auzeville-Tolosane (FR); Wenkang Lu, Suzhou (CN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,534

(22) Filed: Mar. 26, 2020

(65) Prior Publication Data

US 2020/0226335 A1 Jul. 16, 2020

Related U.S. Application Data

(63) Continuation of application No. 16/052,039, filed on Aug. 1, 2018, now Pat. No. 10,635,871.

(30) Foreign Application Priority Data

Aug. 4, 2017 (CN) .......................... 2017 1 0661845

(51) Int. Cl.

*G06K 7/00* (2006.01)
*G06K 7/10* (2006.01)
*H04R 1/02* (2006.01)

(52) U.S. Cl.

CPC ..... *G06K 7/10821* (2013.01); *G06K 7/10128* (2013.01); *G06K 7/10712* (2013.01); (Continued)

(58) Field of Classification Search

CPC ............. G04K 7/10881; G04K 7/1443; G04K 7/10772; G04K 7/1413; G01B 11/02

(Continued)

(56) References Cited

U.S. PATENT DOCUMENTS 3,913,877 A 10/1975 Wiener
6,243,260 B1 6/2001 Lundgren et al.
(Continued)

FOREIGN PATENT DOCUMENTS

JP 2003-333459 A 11/2003
WO 2013/163789 A1 11/2013
(Continued)

OTHER PUBLICATIONS

US 8,548,242 B1, 10/2013, Longacre (withdrawn)
(Continued)

*Primary Examiner* — Daniel St Cyr
(74) *Attorney, Agent, or Firm* — Alston & Bird LLP

(57) ABSTRACT

An indicia reader can include an indicia-capturing system, an indicia-decoding module, and an audio indicator system having a sound source. An indicia-reader housing can support these components, and the housing includes two adjacent mounting surfaces and a sound port opening formed within a portion of the common edge of the two adjacent surfaces. The indicia reader can be operatively mounted in at least two different positions by attaching one of the two adjacent surfaces to a support structure. The reader's sound port opening is in acoustic communication with the sound source of the audio indicator for transmitting audible indications emitted via the audio indicator system when the indicia reader is mounted in either of the at least two different mounting positions.

20 Claims, 6 Drawing Sheets

(52) U.S. Cl.
CPC ......... *G06K 7/10722* (2013.01); *H04R 1/028* (2013.01); *H04R 1/02* (2013.01)

(58) Field of Classification Search
USPC .................................. 235/439, 454, 462.14
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,266,210 | B2 | 9/2007 | Lam et al. |
| 7,413,127 | B2 | 8/2008 | Ehrhart et al. |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,376,233 | B2 | 2/2013 | Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Van et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,490,877 | B2 | 7/2013 | Kearney |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein, Jr. |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre, Jr. |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz, Sr. |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| D716,285 | S | 10/2014 | Chaney et al. |
| 8,851,383 | B2 | 10/2014 | Yeakley et al. |
| 8,868,421 | B2 | 10/2014 | Braho et al. |
| 8,868,519 | B2 | 10/2014 | Maloy et al. |
| 8,868,802 | B2 | 10/2014 | Barten |
| 8,868,803 | B2 | 10/2014 | Caballero |
| 8,870,074 | B1 | 10/2014 | Gannon |
| 8,879,639 | B2 | 11/2014 | Sauerwein, Jr. |
| 8,880,426 | B2 | 11/2014 | Smith |
| 8,881,983 | B2 | 11/2014 | Havens et al. |
| 8,881,987 | B2 | 11/2014 | Wang |
| 8,908,995 | B2 | 12/2014 | Benos et al. |
| 8,910,870 | B2 | 12/2014 | Li et al. |
| 8,910,875 | B2 | 12/2014 | Ren et al. |
| 8,914,290 | B2 | 12/2014 | Hendrickson et al. |
| 8,914,788 | B2 | 12/2014 | Pettinelli et al. |
| 8,915,439 | B2 | 12/2014 | Feng et al. |
| 8,915,444 | B2 | 12/2014 | Havens et al. |
| 8,916,789 | B2 | 12/2014 | Woodburn |
| 8,918,250 | B2 | 12/2014 | Hollifield |
| 8,925,818 | B2 | 1/2015 | Kosecki et al. |
| 8,939,374 | B2 | 1/2015 | Jovanovski et al. |
| 8,942,480 | B2 | 1/2015 | Ellis |
| 8,944,313 | B2 | 2/2015 | Williams et al. |
| 8,944,327 | B2 | 2/2015 | Meier et al. |
| 8,944,332 | B2 | 2/2015 | Harding et al. |
| 8,950,678 | B2 | 2/2015 | Germaine et al. |

(56) References Cited

U.S. PATENT DOCUMENTS

| | | | |
|---|---|---|---|
| D723,560 | S | 3/2015 | Zhou et al. |
| 8,971,346 | B2 | 3/2015 | Sevier |
| 8,976,030 | B2 | 3/2015 | Cunningham et al. |
| 8,976,368 | B2 | 3/2015 | El et al. |
| 8,978,981 | B2 | 3/2015 | Guan |
| 8,978,983 | B2 | 3/2015 | Bremer et al. |
| 8,978,984 | B2 | 3/2015 | Hennick et al. |
| 8,985,456 | B2 | 3/2015 | Zhu et al. |
| 8,985,457 | B2 | 3/2015 | Soule et al. |
| 8,985,459 | B2 | 3/2015 | Kearney et al. |
| 8,985,461 | B2 | 3/2015 | Gelay et al. |
| 8,988,578 | B2 | 3/2015 | Showering |
| 8,988,590 | B2 | 3/2015 | Gillet et al. |
| 8,991,704 | B2 | 3/2015 | Hopper et al. |
| 8,996,194 | B2 | 3/2015 | Davis et al. |
| 8,996,384 | B2 | 3/2015 | Funyak et al. |
| 8,998,091 | B2 | 4/2015 | Edmonds et al. |
| 9,010,641 | B2 | 4/2015 | Qu et al. |
| 9,015,513 | B2 | 4/2015 | Murawski et al. |
| 9,016,576 | B2 | 4/2015 | Brady et al. |
| D730,357 | S | 5/2015 | Fitch et al. |
| 9,022,288 | B2 | 5/2015 | Nahill et al. |
| 9,030,964 | B2 | 5/2015 | Essinger et al. |
| 9,033,240 | B2 | 5/2015 | Smith et al. |
| 9,033,242 | B2 | 5/2015 | Gillet et al. |
| 9,036,054 | B2 | 5/2015 | Koziol et al. |
| 9,037,344 | B2 | 5/2015 | Chamberlin |
| 9,038,911 | B2 | 5/2015 | Xian et al. |
| 9,038,915 | B2 | 5/2015 | Smith |
| D730,901 | S | 6/2015 | Oberpriller et al. |
| D730,902 | S | 6/2015 | Fitch et al. |
| D733,112 | S | 6/2015 | Chaney et al. |
| 9,047,420 | B2 | 6/2015 | Caballero |
| 9,047,525 | B2 | 6/2015 | Barber et al. |
| 9,047,531 | B2 | 6/2015 | Showering et al. |
| 9,049,640 | B2 | 6/2015 | Wang et al. |
| 9,053,055 | B2 | 6/2015 | Caballero |
| 9,053,378 | B1 | 6/2015 | Hou et al. |
| 9,053,380 | B2 | 6/2015 | Xian et al. |
| 9,057,641 | B2 | 6/2015 | Amundsen et al. |
| 9,058,526 | B2 | 6/2015 | Powilleit |
| 9,061,527 | B2 | 6/2015 | Tobin et al. |
| 9,064,165 | B2 | 6/2015 | Havens et al. |
| 9,064,167 | B2 | 6/2015 | Xian et al. |
| 9,064,168 | B2 | 6/2015 | Todeschini et al. |
| 9,064,254 | B2 | 6/2015 | Todeschini et al. |
| 9,070,032 | B2 | 6/2015 | Corcoran |
| D734,339 | S | 7/2015 | Zhou et al. |
| D734,751 | S | 7/2015 | Oberpriller et al. |
| 9,079,423 | B2 | 7/2015 | Bouverie et al. |
| 9,092,683 | B2 | 7/2015 | Koziol et al. |
| 9,093,141 | B2 | 7/2015 | Liu |
| 9,104,934 | B2 | 8/2015 | Li et al. |
| 9,111,166 | B2 | 8/2015 | Cunningham, IV |
| 9,137,009 | B1 | 9/2015 | Gardiner |
| 9,158,000 | B2 | 10/2015 | Sauerwein, Jr. |
| 9,158,340 | B2 | 10/2015 | Reed et al. |
| 9,158,953 | B2 | 10/2015 | Gillet et al. |
| 9,159,059 | B2 | 10/2015 | Daddabbo et al. |
| 9,171,543 | B2 | 10/2015 | Emerick et al. |
| 9,183,425 | B2 | 11/2015 | Wang |
| 9,189,669 | B2 | 11/2015 | Zhu et al. |
| 9,202,458 | B2 | 12/2015 | Braho et al. |
| 9,219,836 | B2 | 12/2015 | Bouverie et al. |
| 9,224,024 | B2 | 12/2015 | Bremer et al. |
| 9,224,027 | B2 | 12/2015 | Van et al. |
| D747,321 | S | 1/2016 | London et al. |
| 9,230,140 | B1 | 1/2016 | Ackley |
| 9,245,492 | B2 | 1/2016 | Ackley et al. |
| 9,248,640 | B2 | 2/2016 | Heng |
| 9,250,712 | B1 | 2/2016 | Todeschini |
| 9,258,033 | B2 | 2/2016 | Showering |
| 9,261,398 | B2 | 2/2016 | Amundsen et al. |
| 9,262,633 | B1 | 2/2016 | Todeschini et al. |
| 9,262,664 | B2 | 2/2016 | Soule et al. |
| 9,269,036 | B2 | 2/2016 | Bremer |
| 9,270,782 | B2 | 2/2016 | Hala et al. |
| 9,274,806 | B2 | 3/2016 | Barten |
| 9,274,812 | B2 | 3/2016 | Doren et al. |
| 9,275,388 | B2 | 3/2016 | Havens et al. |
| 9,277,668 | B2 | 3/2016 | Feng et al. |
| 9,280,693 | B2 | 3/2016 | Feng et al. |
| 9,282,501 | B2 | 3/2016 | Wang et al. |
| 9,286,496 | B2 | 3/2016 | Smith |
| 9,292,969 | B2 | 3/2016 | Laffargue et al. |
| 9,298,667 | B2 | 3/2016 | Caballero |
| 9,298,964 | B2 | 3/2016 | Li et al. |
| 9,301,427 | B2 | 3/2016 | Feng et al. |
| 9,310,609 | B2 | 4/2016 | Rueblinger et al. |
| 9,317,037 | B2 | 4/2016 | Byford et al. |
| 9,319,548 | B2 | 4/2016 | Showering et al. |
| D757,009 | S | 5/2016 | Oberpriller et al. |
| 9,342,724 | B2 | 5/2016 | McCloskey et al. |
| 9,342,827 | B2 | 5/2016 | Smith |
| 9,355,294 | B2 | 5/2016 | Smith et al. |
| 9,360,304 | B2 | 6/2016 | Xue et al. |
| 9,361,882 | B2 | 6/2016 | Ressler et al. |
| 9,365,381 | B2 | 6/2016 | Colonel et al. |
| 9,367,722 | B2 | 6/2016 | Xian et al. |
| 9,373,018 | B2 | 6/2016 | Colavito et al. |
| 9,375,945 | B1 | 6/2016 | Bowles |
| D760,719 | S | 7/2016 | Zhou et al. |
| 9,390,596 | B1 | 7/2016 | Todeschini |
| 9,396,375 | B2 | 7/2016 | Qu et al. |
| 9,398,008 | B2 | 7/2016 | Todeschini et al. |
| D762,604 | S | 8/2016 | Fitch et al. |
| D762,647 | S | 8/2016 | Fitch et al. |
| 9,405,011 | B2 | 8/2016 | Showering |
| 9,407,840 | B2 | 8/2016 | Wang |
| 9,411,386 | B2 | 8/2016 | Sauerwein, Jr. |
| 9,412,242 | B2 | 8/2016 | Van et al. |
| 9,418,252 | B2 | 8/2016 | Nahill et al. |
| 9,418,269 | B2 | 8/2016 | Havens et al. |
| 9,418,270 | B2 | 8/2016 | Van et al. |
| 9,423,318 | B2 | 8/2016 | Liu et al. |
| D766,244 | S | 9/2016 | Zhou et al. |
| 9,443,123 | B2 | 9/2016 | Hejl |
| 9,443,222 | B2 | 9/2016 | Singel et al. |
| 9,448,610 | B2 | 9/2016 | Davis et al. |
| 9,454,689 | B2 | 9/2016 | McCloskey et al. |
| 9,478,113 | B2 | 10/2016 | Xie et al. |
| D771,631 | S | 11/2016 | Fitch et al. |
| 9,481,186 | B2 | 11/2016 | Bouverie et al. |
| 9,488,986 | B1 | 11/2016 | Solanki |
| 9,489,782 | B2 | 11/2016 | Payne et al. |
| 9,490,540 | B1 | 11/2016 | Davies et al. |
| 9,491,729 | B2 | 11/2016 | Rautiola et al. |
| 9,497,092 | B2 | 11/2016 | Gomez et al. |
| 9,507,974 | B1 | 11/2016 | Todeschini |
| 9,519,814 | B2 | 12/2016 | Cudzilo |
| 9,521,331 | B2 | 12/2016 | Bessettes et al. |
| D777,166 | S | 1/2017 | Bidwell et al. |
| 9,558,386 | B2 | 1/2017 | Yeakley |
| 9,582,696 | B2 | 2/2017 | Barber et al. |
| 9,606,581 | B1 | 3/2017 | Howe et al. |
| D783,601 | S | 4/2017 | Schulte et al. |
| 9,616,749 | B2 | 4/2017 | Chamberlin |
| 9,618,993 | B2 | 4/2017 | Murawski et al. |
| D785,617 | S | 5/2017 | Bidwell et al. |
| D785,636 | S | 5/2017 | Oberpriller et al. |
| 9,646,189 | B2 | 5/2017 | Lu et al. |
| 9,646,191 | B2 | 5/2017 | Unemyr et al. |
| 9,652,648 | B2 | 5/2017 | Ackley et al. |
| 9,652,653 | B2 | 5/2017 | Todeschini et al. |
| 9,656,487 | B2 | 5/2017 | Ho et al. |
| 9,659,198 | B2 | 5/2017 | Giordano et al. |
| D790,505 | S | 6/2017 | Vargo et al. |
| D790,546 | S | 6/2017 | Zhou et al. |
| D790,553 | S | 6/2017 | Fitch et al. |
| 9,680,282 | B2 | 6/2017 | Hanenburg |
| 9,697,401 | B2 | 7/2017 | Feng et al. |
| 9,701,140 | B1 | 7/2017 | Alaganchetty et al. |
| 9,715,614 | B2 | 7/2017 | Todeschini et al. |
| 9,734,493 | B2 | 8/2017 | Gomez et al. |

(56) References Cited

U.S. PATENT DOCUMENTS 10,019,334 B2 7/2018 Caballero et al.
10,021,043 B2 7/2018 Sevier
10,327,158 B2 6/2019 Wang et al.
10,410,029 B2 9/2019 Powilleit
10,635,871 B2 * 4/2020 Stang ................. G06K 7/10821
2007/0063048 A1 3/2007 Havens et al.
2008/0185432 A1 8/2008 Caballero et al.
2009/0134221 A1 5/2009 Zhu et al.
2010/0177076 A1 7/2010 Essinger et al.
2010/0177080 A1 7/2010 Essinger et al.
2010/0177707 A1 7/2010 Essinger et al.
2010/0177749 A1 7/2010 Essinger et al.
2010/0265880 A1 10/2010 Rautiola et al.
2011/0169999 A1 7/2011 Grunow et al.
2011/0202554 A1 8/2011 Powilleit et al.
2012/0111946 A1 5/2012 Golant
2012/0168511 A1 7/2012 Kotlarsky et al.
2012/0168512 A1 * 7/2012 Kotlarsky .............. G06K 7/109
235/462.11
2012/0193423 A1 8/2012 Samek
2012/0203647 A1 8/2012 Smith
2012/0223141 A1 9/2012 Good et al.
2012/0228382 A1 9/2012 Havens et al.
2012/0248188 A1 10/2012 Kearney
2013/0043312 A1 2/2013 Van Horn
2013/0075168 A1 3/2013 Amundsen et al.
2013/0082104 A1 4/2013 Kearney et al.
2013/0175341 A1 7/2013 Kearney et al.
2013/0175343 A1 7/2013 Good
2013/0257744 A1 10/2013 Daghigh et al.
2013/0257759 A1 10/2013 Daghigh
2013/0270346 A1 10/2013 Xian et al.
2013/0287258 A1 10/2013 Kearney
2013/0292475 A1 11/2013 Kotlarsky et al.
2013/0292477 A1 11/2013 Hennick et al.
2013/0293539 A1 11/2013 Hunt et al.
2013/0293540 A1 11/2013 Laffargue et al.
2013/0306728 A1 11/2013 Thuries et al.
2013/0306731 A1 11/2013 Pedrao
2013/0307964 A1 11/2013 Bremer et al.
2013/0308625 A1 11/2013 Park et al.
2013/0313324 A1 11/2013 Koziol et al.
2013/0313325 A1 11/2013 Wilz et al.
2013/0332524 A1 12/2013 Fiala et al.
2013/0342717 A1 12/2013 Havens et al.
2014/0001267 A1 1/2014 Giordano et al.
2014/0002828 A1 1/2014 Laffargue et al.
2014/0008439 A1 1/2014 Wang
2014/0025584 A1 1/2014 Liu et al.
2014/0034734 A1 2/2014 Sauerwein, Jr.
2014/0036848 A1 2/2014 Pease et al.
2014/0039693 A1 2/2014 Havens et al.
2014/0042814 A1 2/2014 Kather et al.
2014/0049120 A1 2/2014 Kohtz et al.
2014/0049635 A1 2/2014 Laffargue et al.
2014/0061306 A1 3/2014 Wu et al.
2014/0063289 A1 3/2014 Hussey et al.
2014/0066136 A1 3/2014 Sauerwein et al.
2014/0067692 A1 3/2014 Ye et al.
2014/0070005 A1 3/2014 Nahill et al.
2014/0071840 A1 3/2014 Venancio
2014/0074746 A1 3/2014 Wang
2014/0076974 A1 3/2014 Havens et al.
2014/0078341 A1 3/2014 Havens et al.
2014/0078342 A1 3/2014 Li et al.
2014/0078345 A1 3/2014 Showering
2014/0097249 A1 4/2014 Gomez et al.
2014/0098792 A1 4/2014 Wang et al.
2014/0100774 A1 4/2014 Showering
2014/0100813 A1 4/2014 Showering
2014/0103115 A1 4/2014 Meier et al.
2014/0104413 A1 4/2014 McCloskey et al.
2014/0104414 A1 4/2014 McCloskey et al.
2014/0104416 A1 4/2014 Giordano et al.
2014/0104451 A1 4/2014 Todeschini et al.
2014/0106594 A1 4/2014 Skvoretz
2014/0106725 A1 4/2014 Sauerwein, Jr.
2014/0108010 A1 4/2014 Maltseff et al.
2014/0108402 A1 4/2014 Gomez et al.
2014/0108682 A1 4/2014 Caballero
2014/0110485 A1 4/2014 Toa et al.
2014/0114530 A1 4/2014 Fitch et al.
2014/0124577 A1 5/2014 Wang et al.
2014/0124579 A1 5/2014 Ding
2014/0125842 A1 5/2014 Winegar
2014/0125853 A1 5/2014 Wang
2014/0125999 A1 5/2014 Longacre et al.
2014/0129378 A1 5/2014 Richardson
2014/0131438 A1 5/2014 Kearney
2014/0131441 A1 5/2014 Nahill et al.
2014/0131443 A1 5/2014 Smith
2014/0131444 A1 5/2014 Wang
2014/0131445 A1 5/2014 Ding et al.
2014/0131448 A1 5/2014 Xian et al.
2014/0133379 A1 5/2014 Wang et al.
2014/0136208 A1 5/2014 Maltseff et al.
2014/0140585 A1 5/2014 Wang
2014/0151453 A1 6/2014 Meier et al.
2014/0152882 A1 6/2014 Samek et al.
2014/0158770 A1 6/2014 Sevier et al.
2014/0159869 A1 6/2014 Zumsteg et al.
2014/0166755 A1 6/2014 Liu et al.
2014/0166757 A1 6/2014 Smith
2014/0166759 A1 6/2014 Liu et al.
2014/0168787 A1 6/2014 Wang et al.
2014/0175165 A1 6/2014 Havens et al.
2014/0175172 A1 6/2014 Jovanovski et al.
2014/0191644 A1 7/2014 Chaney
2014/0191913 A1 7/2014 Ge et al.
2014/0197238 A1 7/2014 Liu et al.
2014/0197239 A1 7/2014 Havens et al.
2014/0197304 A1 7/2014 Feng et al.
2014/0204268 A1 7/2014 Grunow et al.
2014/0214631 A1 7/2014 Hansen
2014/0217166 A1 8/2014 Berthiaume et al.
2014/0217180 A1 8/2014 Liu
2014/0231500 A1 8/2014 Ehrhart et al.
2014/0232930 A1 8/2014 Anderson
2014/0247315 A1 9/2014 Marty et al.
2014/0263493 A1 9/2014 Amurgis et al.
2014/0263645 A1 9/2014 Smith et al.
2014/0267609 A1 9/2014 Laffargue
2014/0270196 A1 9/2014 Braho et al.
2014/0270229 A1 9/2014 Braho
2014/0277337 A1 9/2014 Chen
2014/0278387 A1 9/2014 Digregorio
2014/0278391 A1 9/2014 Braho et al.
2014/0282210 A1 9/2014 Bianconi
2014/0283282 A1 9/2014 Dye et al.
2014/0284384 A1 9/2014 Lu et al.
2014/0288933 A1 9/2014 Braho et al.
2014/0297058 A1 10/2014 Barker et al.
2014/0299665 A1 10/2014 Barber et al.
2014/0312121 A1 10/2014 Lu et al.
2014/0319220 A1 10/2014 Coyle
2014/0319221 A1 10/2014 Oberpriller et al.
2014/0326787 A1 11/2014 Barten
2014/0332590 A1 11/2014 Wang et al.
2014/0344943 A1 11/2014 Todeschini et al.
2014/0346233 A1 11/2014 Liu et al.
2014/0351317 A1 11/2014 Smith et al.
2014/0353373 A1 12/2014 Van et al.
2014/0361073 A1 12/2014 Qu et al.
2014/0361082 A1 12/2014 Xian et al.
2014/0362184 A1 12/2014 Jovanovski et al.
2014/0363015 A1 12/2014 Braho
2014/0369511 A1 12/2014 Sheerin et al.
2014/0374483 A1 12/2014 Lu
2014/0374485 A1 12/2014 Xian et al.
2015/0001301 A1 1/2015 Ouyang
2015/0001304 A1 1/2015 Todeschini
2015/0003673 A1 1/2015 Fletcher
2015/0009338 A1 1/2015 Laffargue et al.
2015/0009610 A1 1/2015 London et al.

(56) References Cited

U.S. PATENT DOCUMENTS

2015/0014416 A1 1/2015 Kotlarsky et al.
2015/0021397 A1 1/2015 Rueblinger et al.
2015/0028102 A1 1/2015 Ren et al.
2015/0028103 A1 1/2015 Jiang
2015/0028104 A1 1/2015 Ma et al.
2015/0029002 A1 1/2015 Yeakley et al.
2015/0032709 A1 1/2015 Maloy et al.
2015/0039309 A1 2/2015 Braho et al.
2015/0039878 A1 2/2015 Barten
2015/0040378 A1 2/2015 Saber et al.
2015/0048168 A1 2/2015 Fritz et al.
2015/0049347 A1 2/2015 Laffargue et al.
2015/0051992 A1 2/2015 Smith
2015/0053766 A1 2/2015 Havens et al.
2015/0053768 A1 2/2015 Wang et al.
2015/0053769 A1 2/2015 Thuries et al.
2015/0060544 A1 3/2015 Feng et al.
2015/0062366 A1 3/2015 Liu et al.
2015/0063215 A1 3/2015 Wang
2015/0063676 A1 3/2015 Lloyd et al.
2015/0069130 A1 3/2015 Gannon
2015/0071819 A1 3/2015 Todeschini
2015/0083800 A1 3/2015 Li et al.
2015/0086114 A1 3/2015 Todeschini
2015/0088522 A1 3/2015 Hendrickson et al.
2015/0096872 A1 4/2015 Woodburn
2015/0099557 A1 4/2015 Pettinelli et al.
2015/0100196 A1 4/2015 Hollifield
2015/0102109 A1 4/2015 Huck
2015/0115035 A1 4/2015 Meier et al.
2015/0127791 A1 5/2015 Kosecki et al.
2015/0128116 A1 5/2015 Chen et al.
2015/0129659 A1 5/2015 Feng et al.
2015/0133047 A1 5/2015 Smith et al.
2015/0134470 A1 5/2015 Hejl et al.
2015/0136851 A1 5/2015 Harding et al.
2015/0136854 A1 5/2015 Lu et al.
2015/0142492 A1 5/2015 Kumar
2015/0144692 A1 5/2015 Hejl
2015/0144698 A1 5/2015 Teng et al.
2015/0144701 A1 5/2015 Xian et al.
2015/0149946 A1 5/2015 Benos et al.
2015/0161429 A1 6/2015 Xian
2015/0169925 A1 6/2015 Chen et al.
2015/0169929 A1 6/2015 Williams et al.
2015/0178523 A1 6/2015 Gelay et al.
2015/0178534 A1 6/2015 Jovanovski et al.
2015/0178535 A1 6/2015 Bremer et al.
2015/0178536 A1 6/2015 Hennick et al.
2015/0178537 A1 6/2015 El et al.
2015/0181093 A1 6/2015 Zhu et al.
2015/0181109 A1 6/2015 Gillet et al.
2015/0186703 A1 7/2015 Chen et al.
2015/0193644 A1 7/2015 Kearney et al.
2015/0199957 A1 7/2015 Funyak et al.
2015/0210199 A1 7/2015 Payne
2015/0220753 A1 8/2015 Zhu et al.
2015/0254485 A1 9/2015 Feng et al.
2015/0310243 A1 10/2015 Ackley et al.
2015/0310389 A1 10/2015 Crimm et al.
2015/0327012 A1 11/2015 Bian et al.
2016/0014251 A1 1/2016 Hejl
2016/0040982 A1 2/2016 Li et al.
2016/0042241 A1 2/2016 Todeschini
2016/0057230 A1 2/2016 Todeschini et al.
2016/0062473 A1 3/2016 Bouchat et al.
2016/0092805 A1 3/2016 Geisler et al.
2016/0101936 A1 4/2016 Chamberlin
2016/0102975 A1 4/2016 McCloskey et al.
2016/0104019 A1 4/2016 Todeschini et al.
2016/0104274 A1 4/2016 Jovanovski et al.
2016/0109219 A1 4/2016 Ackley et al.
2016/0109220 A1 4/2016 Laffargue et al.
2016/0109224 A1 4/2016 Thuries et al.
2016/0112631 A1 4/2016 Ackley et al.
2016/0112643 A1 4/2016 Laffargue et al.
2016/0117627 A1 4/2016 Raj et al.
2016/0124516 A1 5/2016 Schoon et al.
2016/0125217 A1 5/2016 Todeschini
2016/0125342 A1 5/2016 Miller et al.
2016/0125873 A1 5/2016 Braho et al.
2016/0133253 A1 5/2016 Braho et al.
2016/0171597 A1 6/2016 Todeschini
2016/0171666 A1 6/2016 McCloskey
2016/0171720 A1 6/2016 Todeschini
2016/0171775 A1 6/2016 Todeschini et al.
2016/0171777 A1 6/2016 Todeschini et al.
2016/0174674 A1 6/2016 Oberpriller et al.
2016/0178479 A1 6/2016 Goldsmith
2016/0178685 A1 6/2016 Young et al.
2016/0178707 A1 6/2016 Young et al.
2016/0179132 A1 6/2016 Harr
2016/0179143 A1 6/2016 Bidwell et al.
2016/0179368 A1 6/2016 Roeder
2016/0179378 A1 6/2016 Kent et al.
2016/0180130 A1 6/2016 Bremer
2016/0180133 A1 6/2016 Oberpriller et al.
2016/0180136 A1 6/2016 Meier et al.
2016/0180594 A1 6/2016 Todeschini
2016/0180663 A1 6/2016 McMahan et al.
2016/0180678 A1 6/2016 Ackley et al.
2016/0180713 A1 6/2016 Bernhardt et al.
2016/0185136 A1 6/2016 Ng et al.
2016/0185291 A1 6/2016 Chamberlin
2016/0186926 A1 6/2016 Oberpriller et al.
2016/0188861 A1 6/2016 Todeschini
2016/0188939 A1 6/2016 Sailors et al.
2016/0188940 A1 6/2016 Lu et al.
2016/0188941 A1 6/2016 Todeschini et al.
2016/0188942 A1 6/2016 Good et al.
2016/0188943 A1 6/2016 Franz
2016/0188944 A1 6/2016 Wilz et al.
2016/0189076 A1 6/2016 Mellott et al.
2016/0189087 A1 6/2016 Morton et al.
2016/0189088 A1 6/2016 Pecorari et al.
2016/0189092 A1 6/2016 George et al.
2016/0189284 A1 6/2016 Mellott et al.
2016/0189288 A1 6/2016 Todeschini et al.
2016/0189366 A1 6/2016 Chamberlin et al.
2016/0189443 A1 6/2016 Smith
2016/0189447 A1 6/2016 Valenzuela
2016/0189489 A1 6/2016 Au et al.
2016/0191684 A1 6/2016 Dipiazza et al.
2016/0192051 A1 6/2016 Dipiazza et al.
2016/0202951 A1 7/2016 Pike et al.
2016/0202958 A1 7/2016 Zabel et al.
2016/0202959 A1 7/2016 Doubleday et al.
2016/0203021 A1 7/2016 Pike et al.
2016/0203429 A1 7/2016 Mellott et al.
2016/0203797 A1 7/2016 Pike et al.
2016/0203820 A1 7/2016 Zabel et al.
2016/0204623 A1 7/2016 Haggerty et al.
2016/0204636 A1 7/2016 Allen et al.
2016/0204638 A1 7/2016 Miraglia et al.
2016/0227912 A1 8/2016 Oberpriller et al.
2016/0232891 A1 8/2016 Pecorari
2016/0292477 A1 10/2016 Bidwell
2016/0294779 A1 10/2016 Yeakley et al.
2016/0306769 A1 10/2016 Kohtz et al.
2016/0314276 A1 10/2016 Wilz et al.
2016/0314294 A1 10/2016 Kubler et al.
2016/0316190 A1 10/2016 McCloskey et al.
2016/0323310 A1 11/2016 Todeschini et al.
2016/0325677 A1 11/2016 Fitch et al.
2016/0327614 A1 11/2016 Young et al.
2016/0327930 A1 11/2016 Charpentier et al.
2016/0328762 A1 11/2016 Pape
2016/0330218 A1 11/2016 Hussey et al.
2016/0343163 A1 11/2016 Venkatesha et al.
2016/0343176 A1 11/2016 Ackley
2016/0364914 A1 12/2016 Todeschini
2016/0370220 A1 12/2016 Ackley et al.
2016/0372282 A1 12/2016 Bandringa
2016/0373847 A1 12/2016 Vargo et al.

(56) References Cited

U.S. PATENT DOCUMENTS

| | | | |
|---|---|---|---|
| 2016/0377414 | A1 | 12/2016 | Thuries et al. |
| 2016/0377417 | A1 | 12/2016 | Jovanovski et al. |
| 2017/0010141 | A1 | 1/2017 | Ackley |
| 2017/0010328 | A1 | 1/2017 | Mullen et al. |
| 2017/0010780 | A1 | 1/2017 | Waldron et al. |
| 2017/0016714 | A1 | 1/2017 | Laffargue et al. |
| 2017/0018094 | A1 | 1/2017 | Todeschini |
| 2017/0046603 | A1 | 2/2017 | Lee et al. |
| 2017/0047864 | A1 | 2/2017 | Stang et al. |
| 2017/0053146 | A1 | 2/2017 | Liu et al. |
| 2017/0053147 | A1 | 2/2017 | Germaine et al. |
| 2017/0053647 | A1 | 2/2017 | Nichols et al. |
| 2017/0055606 | A1 | 3/2017 | Xu et al. |
| 2017/0060316 | A1 | 3/2017 | Larson |
| 2017/0061961 | A1 | 3/2017 | Nichols et al. |
| 2017/0064634 | A1 | 3/2017 | Van et al. |
| 2017/0083730 | A1 | 3/2017 | Feng et al. |
| 2017/0091502 | A1 | 3/2017 | Furlong et al. |
| 2017/0091706 | A1 | 3/2017 | Lloyd et al. |
| 2017/0091741 | A1 | 3/2017 | Todeschini |
| 2017/0091904 | A1 | 3/2017 | Ventress, Jr. |
| 2017/0092908 | A1 | 3/2017 | Chaney |
| 2017/0094238 | A1 | 3/2017 | Germaine et al. |
| 2017/0098947 | A1 | 4/2017 | Wolski |
| 2017/0100949 | A1 | 4/2017 | Celinder et al. |
| 2017/0108838 | A1 | 4/2017 | Todeschini et al. |
| 2017/0108895 | A1 | 4/2017 | Chamberlin et al. |
| 2017/0118355 | A1 | 4/2017 | Wong et al. |
| 2017/0123598 | A1 | 5/2017 | Phan et al. |
| 2017/0124369 | A1 | 5/2017 | Rueblinger et al. |
| 2017/0124396 | A1 | 5/2017 | Todeschini et al. |
| 2017/0124687 | A1 | 5/2017 | McCloskey et al. |
| 2017/0126873 | A1 | 5/2017 | McGary et al. |
| 2017/0126904 | A1 | 5/2017 | D'Armancourt et al. |
| 2017/0139012 | A1 | 5/2017 | Smith |
| 2017/0140329 | A1 | 5/2017 | Bernhardt et al. |
| 2017/0140731 | A1 | 5/2017 | Smith |
| 2017/0147847 | A1 | 5/2017 | Berggren et al. |
| 2017/0150124 | A1 | 5/2017 | Thuries |
| 2017/0169198 | A1 | 6/2017 | Nichols |
| 2017/0171035 | A1 | 6/2017 | Lu et al. |
| 2017/0171703 | A1 | 6/2017 | Maheswaranathan |
| 2017/0171803 | A1 | 6/2017 | Maheswaranathan |
| 2017/0180359 | A1 | 6/2017 | Wolski et al. |
| 2017/0180577 | A1 | 6/2017 | Nguon et al. |
| 2017/0181299 | A1 | 6/2017 | Shi et al. |
| 2017/0190192 | A1 | 7/2017 | Delario et al. |
| 2017/0193432 | A1 | 7/2017 | Bernhardt |
| 2017/0193461 | A1 | 7/2017 | Celinder et al. |
| 2017/0193727 | A1 | 7/2017 | Van et al. |
| 2017/0200108 | A1 | 7/2017 | Au et al. |
| 2017/0200275 | A1 | 7/2017 | Mccloskey et al. |

FOREIGN PATENT DOCUMENTS

| | | | |
|---|---|---|---|
| WO | 2013/173985 | A1 | 11/2013 |
| WO | 2014/019130 | A1 | 2/2014 |
| WO | 2014/110495 | A1 | 7/2014 |

OTHER PUBLICATIONS

US 8,616,454 B2, 12/2013, Havens et al. (withdrawn)

Notice of Allowance and Fees Due (PTOL-85) dated Aug. 29, 2019 for U.S. Appl. No. 16/052,039.

Notice of Allowance and Fees Due (PTOL-85) dated Dec. 30, 2019 for U.S. Appl. No. 16/052,039.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

U.S. Patent Application for Multifunction Point of Sale Apparatus With Optical Signature Capture filed Jul. 30, 2014 (Good et al.), U.S. Appl. No. 14/446,391.

U.S. Patent Application for Multipurpose Optical Reader, filed May 14, 2014 (Jovanovski et al.); 59 pages; now abandoned., U.S. Appl. No. 14/277,337.

U.S. Patent Application for Terminal Having Illumination and Focus Control filed May 21, 2014 (Liu et al.), U.S. Appl. No. 14/283,282.

* cited by examiner

INDICIA READER ACOUSTIC FOR MULTIPLE MOUNTING POSITIONS

CROSS-REFERENCE TO RELATED APPLICATION

The present application is a continuation of U.S. patent application Ser. No. 16/052,039 for INDICIA READER ACOUSTIC FOR MULTIPLE MOUNTING POSITIONS filed Aug. 1, 2018, which claims priority to and the benefit of Chinese Patent Application for Invention No. 201710661845.9 for an INDICIA READER ACOUSTIC FOR MULTIPLE MOUNTING POSITIONS filed Aug. 4, 2017, each of which is incorporated herein by reference in its entirety.

FIELD OF THE INVENTION

The present invention relates generally to the field of indicia readers. More specifically, the present invention relates to acoustic housings for transmitting audible indications to a user of a fixed-position indicia reader when the reader is mounted in various mounting positions.

BACKGROUND

Generally speaking, businesses have sought to maximize efficiency by using various devices to automate data entry. As one particular example, in the area of inventory management the indicia or symbol reading device (e.g., barcode reader, barcode scanner, RFID reader, etc.) has greatly reduced the time and errors inherent to manual data entry.

Indicia readers may fall within a number of general categories including handheld readers (e.g., mobile devices employed as code symbol readers), laser scan engine barcode readers, and image sensor based barcode readers. One such general category of indicia reader includes the fixed-mount or fixed-position indicia reader which may incorporate image sensor and/or laser-based scan engines.

Fixed-position indicia readers, although also potentially usable in a handheld or unmounted arrangement, are typically directed to a hands-free functional design (i.e., are configured to be mounted or installed on any number of mounting surfaces). Fixed-position readers may be utilized in general or rugged environments for a variety of applications (e.g., retail point-of-sale (POS), kiosks, healthcare, package sorting, direct part mark (DPM), boarding pass scanning, etc.). In one particular use case, fixed-mount indicia reading systems may be employed where the indicia (e.g., barcodes) to be read are presented by an operator or by a machine in approximately the same position and orientation on each read or scan attempt.

Fixed-position indicia readers generally include mounting mechanisms (e.g., threaded inserts and mounting screws) for affixing the reader on a mounting surface such as a wall.

Indicia readers may include visual and/or audio indicators for providing information to a user relating to the present status and/or the various operations of the indicia reader (e.g., failure indications, entering a different mode, completing a successful scan, etc.). Decoding success indications may be provided whereby, for example, the illumination system of the reader is switched off and accompanied by an audible indication (i.e., a tone) from a sound source (e.g., a speaker, beeper, etc.) in response to successfully reading a barcode. Further, illumination of an indicator light (e.g., an LED) from the housing of the reader may be provided as an indicator.

In a hands-free system such as a fixed-mount system (e.g., without a user-trigger mechanism), audible indications may be particularly important for providing information relating to the indicia reader's operations (e.g., that a successful scan has occurred). In the case of an audible indication, the sound signal generally travels from a sound source within the reader's housing through openings on a surface of the housing.

For ease of use and for optimal configurability, a fixed-position reader would ideally be accessible for mounting in a broad range of different positions to a mounting surface; for example, by including mounting mechanisms on all or substantially all of the surfaces of the reader's housing. In the case of audible indications, however, the openings exiting on a surface of the housing (i.e., to "voice" the audio) can be blocked by the mounting surface in certain mounting configurations. To solve this problem, additional sound sources having sound openings on additional surfaces can be added, but the additional audio components and related structural features result in increased complexity and cost during manufacturing, as well as a greater potential for component failure during operation.

Therefore, a need exists for more effective fixed-position indicia reading systems, including but not limited to systems including efficient, cost-effective fixed-mount indicia readers for transmitting audible indications to a user when mounted in different positions to a mounting surface.

SUMMARY

Accordingly, in one aspect, the present invention embraces an indicia reader. The indicia reader includes an indicia-capturing system for acquiring information about indicia within the indicia-capturing system's field of view; an indicia-decoding module configured for decoding indicia information within the indicia-capturing system's field of view, the indicia-decoding module having a signal processor; an audio indicator system having a sound source for providing audible indications relating to operations of the indicia reader; and a housing for supporting and at least partially enclosing the indicia-capturing system, the indicia-decoding module, and the audio indicator system. The housing includes two adjacent mounting surfaces that meet to form a common edge, and a sound port opening formed within a portion of the common edge and the two adjacent surfaces, where the sound port opening is recessed inward with respect to the common edge. The indicia reader is configured to be operatively mounted in at least two different positions by respectively attaching one of the two adjacent surfaces to a support structure, and the sound port opening is in acoustic communication with the sound source of the audio indicator for transmitting audible indications emitted via the audio indicator system when the indicia reader is mounted in either of the at least two different mounting positions.

In an exemplary embodiment, each of the two adjacent mounting surfaces includes at least one mounting insert for use in mounting the indicia reader to a support structure.

In another exemplary embodiment, a chamber is positioned within the housing and at least partially enclosing the audio indicator system and the sound source for acoustically communicating with the sound port opening.

In yet another exemplary embodiment, the chamber encloses the sound source, and the chamber includes a sound conducting channel spanning continuously from the sound source to the sound port opening.

In yet another exemplary embodiment, the sound conducting channel forms a continuous acoustic transmission path for transmitting audible indications emitted via the audio indicator system to the opening.

In yet another exemplary embodiment, the housing is substantially rectangular.

In yet another exemplary embodiment, the sound source is a single beeper.

In yet another exemplary embodiment, the sound port opening is formed within a beveled portion of the common edge joining the two adjacent mounting surfaces of the housing.

In yet another exemplary embodiment, the sound source is a single speaker.

In yet another exemplary embodiment, the indicia reader is a fixed-position indicia reader configured for acquiring information about indicia presented within the indicia-capturing system's field of view when the indicia reader is mounted in either of the at least two mounting positions.

In another aspect, the present invention embraces a housing for an indicia reader. The housing includes an audio indicator system at least partially enclosed within the housing, with the audio indicator system having a sound source for providing audible indications to a user relating to indicia reader operations. The housing also includes two adjacent mounting surfaces where the two adjacent mounting surfaces meet to form a common edge, and a sound conducting channel in acoustic communication with the sound source, where the sound conducting channel has a sound port opening formed within a beveled portion of the common edge which joins the two adjacent surfaces. The housing is configured to be mounted in at least two different mounted positions by respectively attaching one of the two adjacent mounting surfaces to a support structure. The sound conducting channel is configured to transmit audible indications emitted via the sound source to the sound port opening when the housing is mounted in either of the at least two different mounted positions.

In an exemplary embodiment, the housing includes and at least partially encloses an indicia-capturing system for acquiring information about indicia within the indicia-capturing system's field of view.

In another exemplary embodiment, the housing includes and at least partially encloses an indicia-decoding module configured for decoding indicia information within the indicia-capturing system's field of view, the indicia-decoding module comprising a signal processor.

In yet another exemplary embodiment, the housing is substantially rectangular.

In yet another exemplary embodiment, the sound source is a single beeper.

In yet another exemplary embodiment, the sound conducting channel includes a chamber positioned within the housing and at least partially enclosing the audio indicator system.

In yet another exemplary embodiment, the chamber encloses the sound source and the sound conducting channel spans continuously to the sound port opening.

In another aspect, the present invention embraces a fixed-position indicia reader. The fixed-position indicia reader includes an indicia-capturing system for acquiring information about indicia presented within the indicia-capturing system's field of view when the fixed-position indicia reader is mounted to a support structure; an audio indicator system for providing audible indications relating to indicia reader operations, the audio indicator system having a sound source comprising a single beeper; and a housing for supporting and at least partially enclosing the indicia-capturing system and the audio indicator system. The housing includes two adjacent mounting surfaces where the two adjacent mounting surfaces meet to form a common edge, and a sound port opening formed within a beveled portion of the common edge joining the two adjacent mounting surfaces. The housing is configured for operatively mounting the fixed-position indicia reader to a support structure in at least two different mounting positions by respectively attaching one of the two adjacent mounting surfaces to a support structure. The sound port opening is in acoustic communication with the sound source for transmitting audible indications emitted from the sound source to the sound port opening when the housing is mounted in either of the at least two different mounting positions.

In an exemplary embodiment, the housing comprises, and at least partially encloses, an indicia-decoding module configured for decoding indicia information within the indicia-capturing system's field of view, the indicia-decoding module including a signal processor.

In another exemplary embodiment, the sound port opening is in acoustic communication with the sound source via a sound conducting channel spanning continuously from the sound source to the sound port opening.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces fixed-position indicia reading systems including mountable indicia readers having acoustic housings for effectively transmitting audible indications from a single sound source from various mounting positions or configurations.

In an exemplary embodiment, the fixed-position indicia reader is configured to be operatively mounted in at least two different positions by respectively attaching one of two adjacent mounting surfaces to a support structure. The exemplary mountable indicia reader also includes a sound port that is in acoustic communication with a sound source for effectively transmitting audible indications to a user when the fixed-position indicia reader is mounted in either of the at least two different mounting positions.

Indicia reading devices are often employed to decode indicia such as barcodes. A barcode is a machine-readable representation of information in graphic format. Traditionally, a barcode is a series of parallel bars and spaces of varying widths (e.g., a linear barcode or 1D barcode).

More recently, there has been an increase in the use of alternatives to the linear barcode. For example, matrix codes (e.g., 2D barcodes, QR Code, Aztec Code, Data Matrix, etc.) and Optical Character Recognition (OCR) have enjoyed increasing popularity. As used herein, terms such as indicia, barcode, and/or code symbol are intended in their broadest sense to include linear barcodes, matrix barcodes, and OCR-enabled labels, but are not limited to these examples.

One category of indicia readers includes laser-based readers, generally including a laser diode assembly generating a laser light beam and a moving mirror for sweeping the laser light beam across a decodable symbol, whereby a signal is generated corresponding to the decodable symbol.

Image sensor-based readers include multi-element image sensors such as CID, CMOS, or CCD image sensors and an imaging optic for focusing an image onto the image sensor. In the operation of an image sensor-based reader, an image of a decodable symbol is focused on an image sensor and a signal is generated corresponding to the symbol. Image sensor elements may be arrayed in a line or in a rectangular matrix or area. Area image sensors, for example, capture a digital picture and use software algorithms to find and decode one or more symbols.

Image sensor-based readers are, generally, more durable and offer additional features relative to laser scan engine readers. Features and functions which have been incorporated into image sensor-based barcode readers include image processing capabilities.

Figure 1:
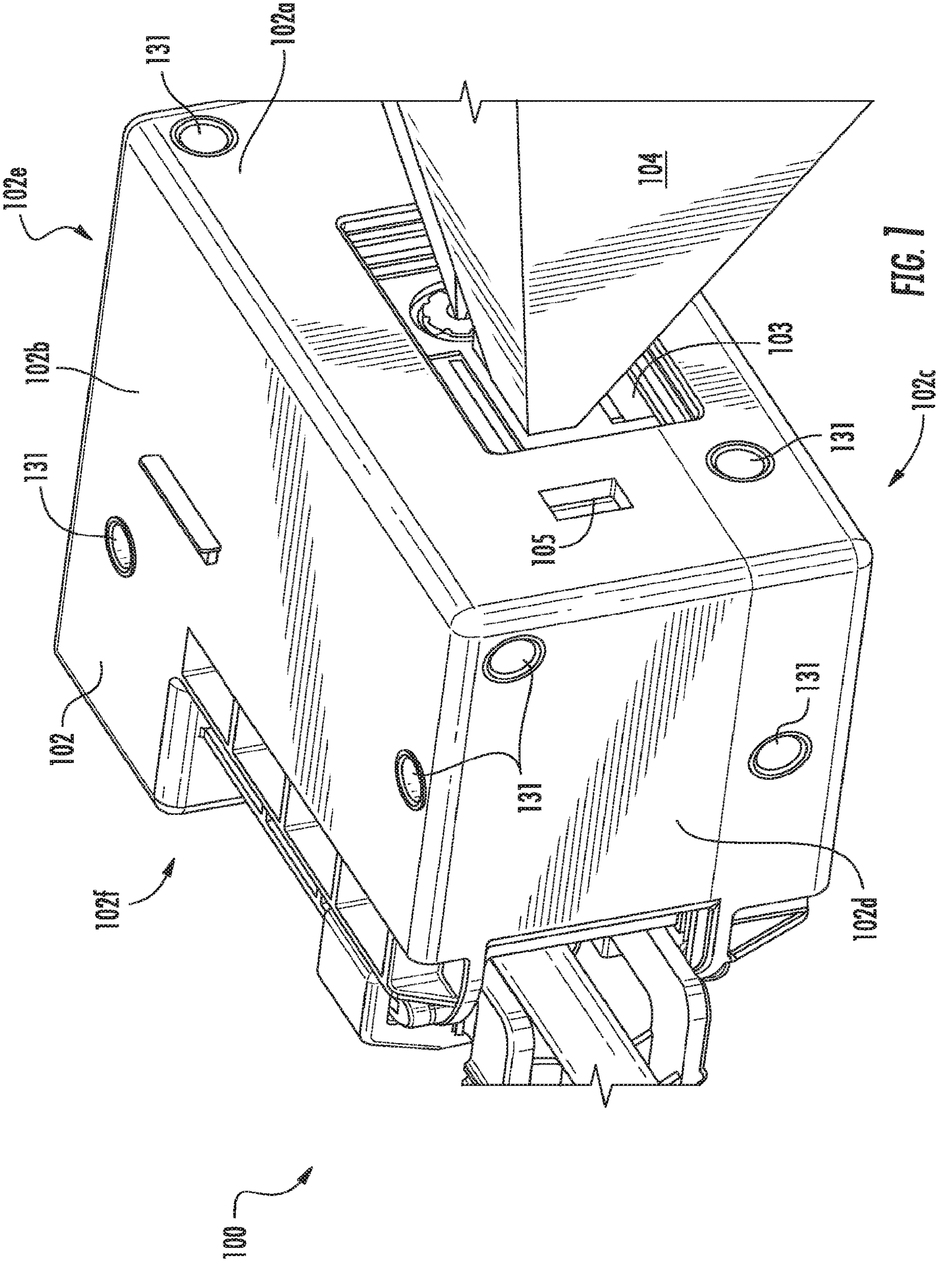
FIG. 1 is a front perspective view depicting an exemplary mountable indicia-reader.
Figure 2:
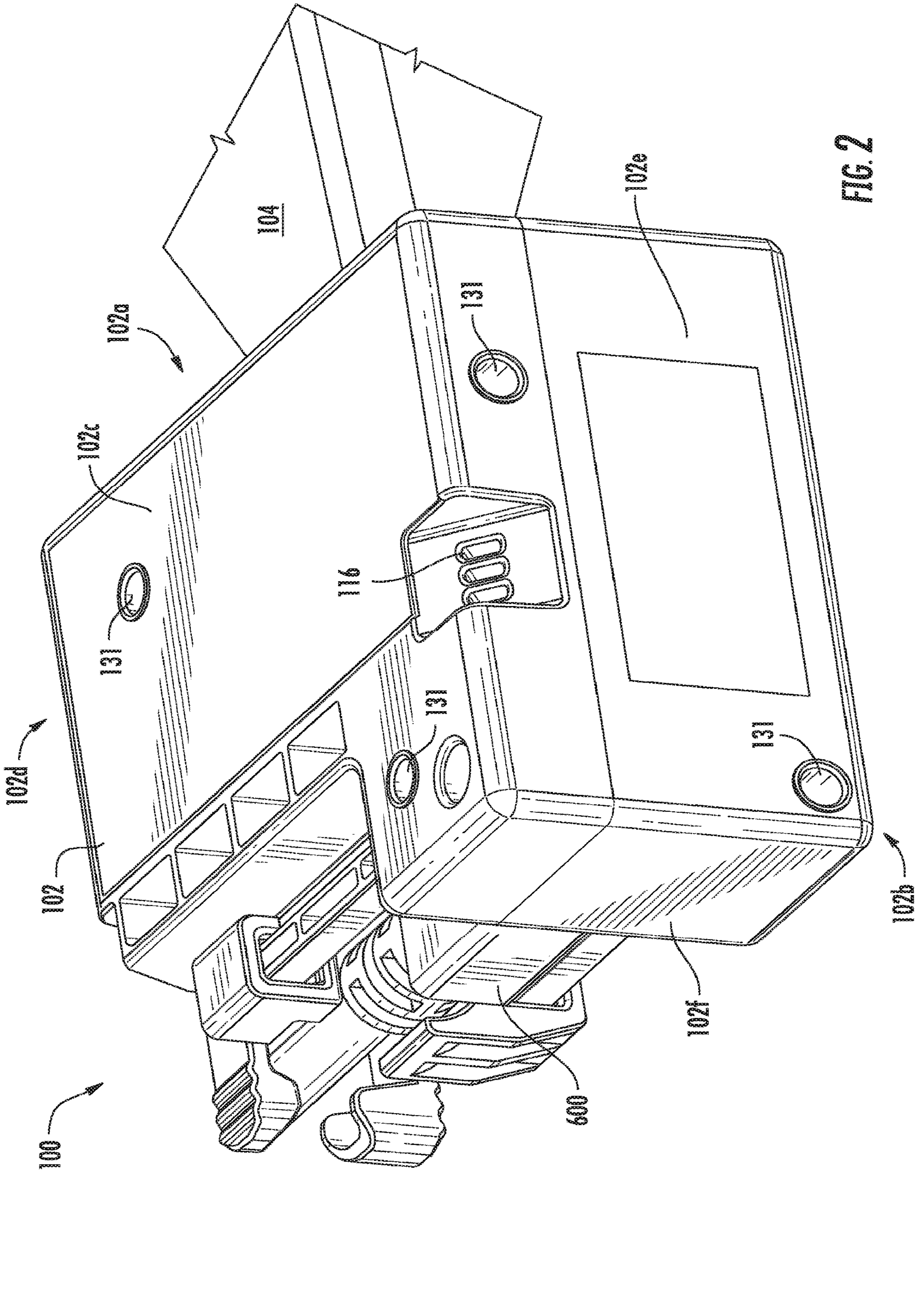
FIG. 2 is a rear perspective view depicting the exemplary mountable indicia-reader.
Figure 6:
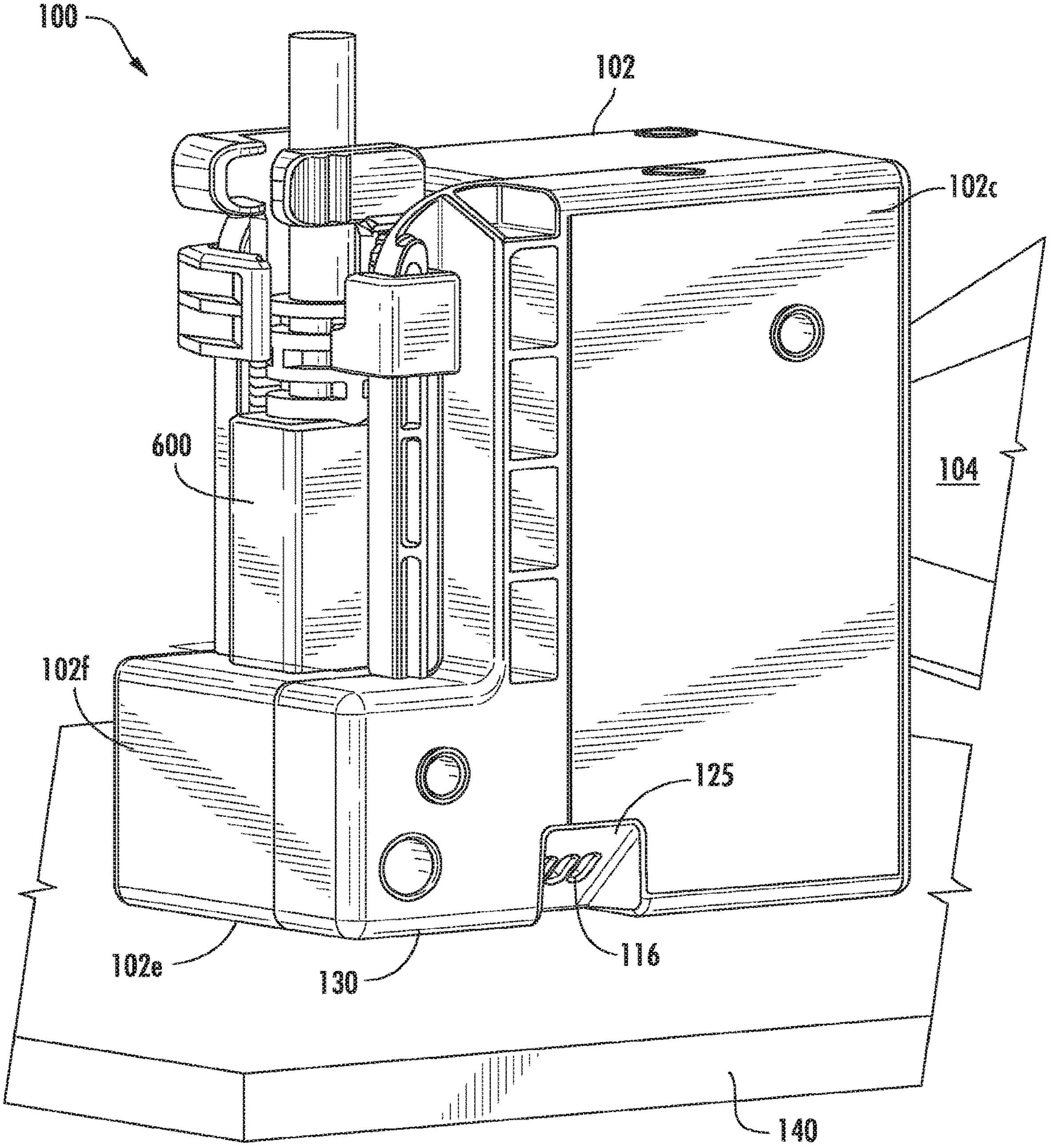
FIG. 6 is a bottom perspective view depicting the exemplary mountable indicia-reader mounted to a support structure.
Figure 7:
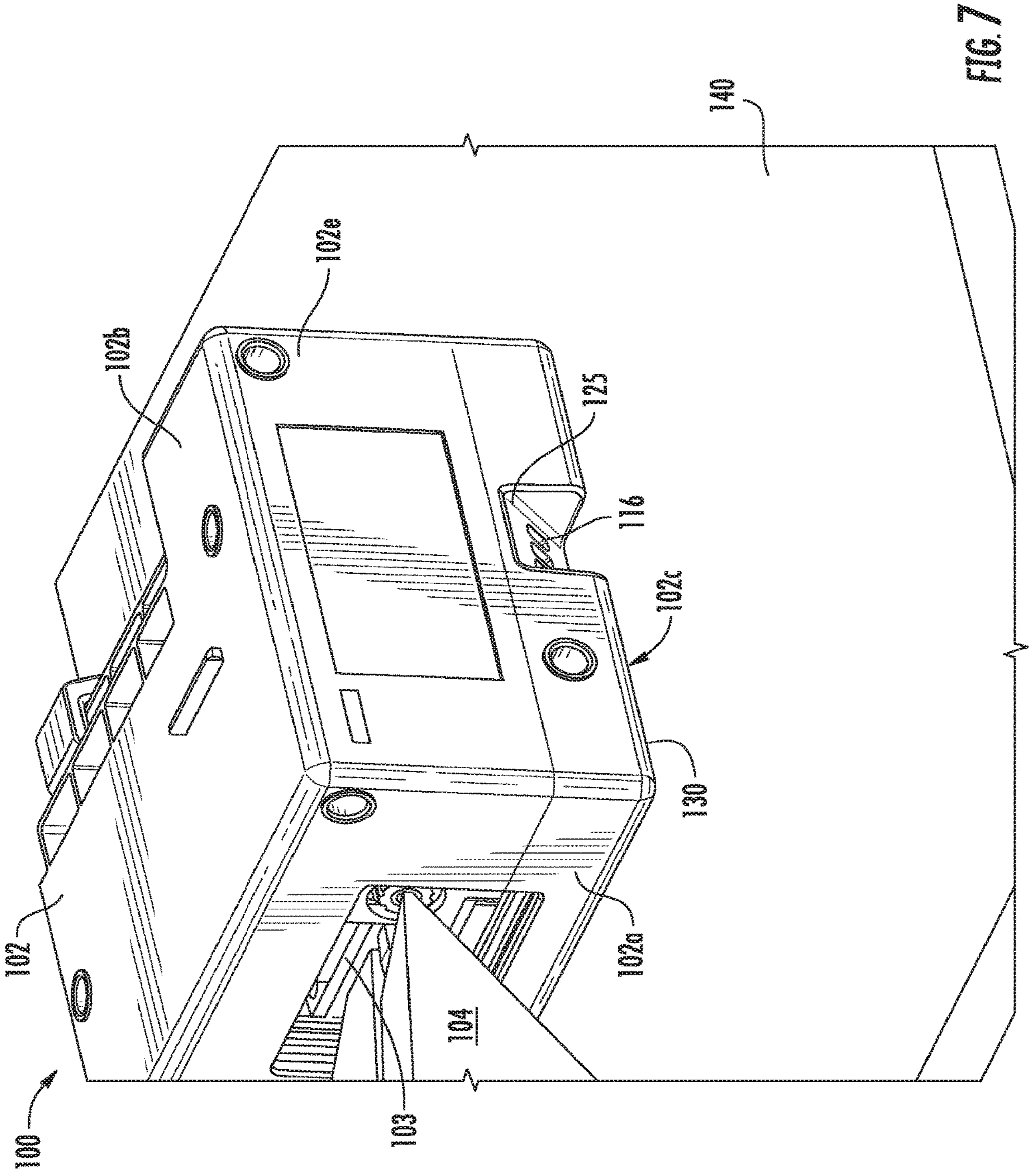
FIG. 7 is a left perspective view depicting the exemplary mountable indicia-reader mounted to a support structure.

With reference to the drawings, FIGS. 1 and 2 depict perspective views an exemplary indicia-reading device according to the present invention, in this case a fixed-position or mountable indicia reader 100 arranged primarily for fixed-position reading. For ease of reference, FIGS. 1 and 2 depict the exemplary reader 100 in an unmounted arrangement. FIGS. 6 and 7, discussed below, depict a mounted arrangement.

The exemplary mountable indicia reader 100 includes a housing 102. The housing 102 has front surface 102*a* including a light transmission window 103 integrated within the front surface portion of the housing 102. The housing 102 further includes a top surface 102*b*, a bottom surface 102*c*, a right-side surface 102*d*, a left-side surface 102*e*, and a back-side surface portion 102*f*. The back-side of the housing incorporates a cable 600 electronically connected to the reader 100 for operation in an exemplary indicia reading system, as further described below with reference to FIG. 4.

Respective surfaces of the indicia reader 100 include mounting mechanisms 131 for affixing or mounting the reader on a mounting surface (e.g., a wall, a table, etc.). In one example, the mounting mechanisms 130 include threaded inserts and corresponding mounting screws, but any of a range of acceptable mechanisms or fasteners may be used. In the present case, the fixed-position reader 100 includes mounting mechanisms 130 on each respective surface except for the back-side portion including connector cable 600 (e.g., substantially all of the surfaces of the reader's housing). Thus, the fixed-position reader 100 is advantageously available for mounting in a broad range of different positions to a mounting surface.

As further described below with reference to FIGS. 5-7, the exemplary mountable indicia reader 100 includes sound ports 116 (FIG. 2) that are in acoustic communication with an audio indicator system having a sound source for transmitting audible indications to a user when the fixed-position indicia reader is mounted in different positions.

Behind the light transmission window 103, the housing 102 may include may include one or more light sensing assemblies (i.e., indicia-capturing systems), such as an image sensor-based reading engine and/or a laser scan engine that is utilized for reading indicia, symbols, images, and the like.

Figure 3:
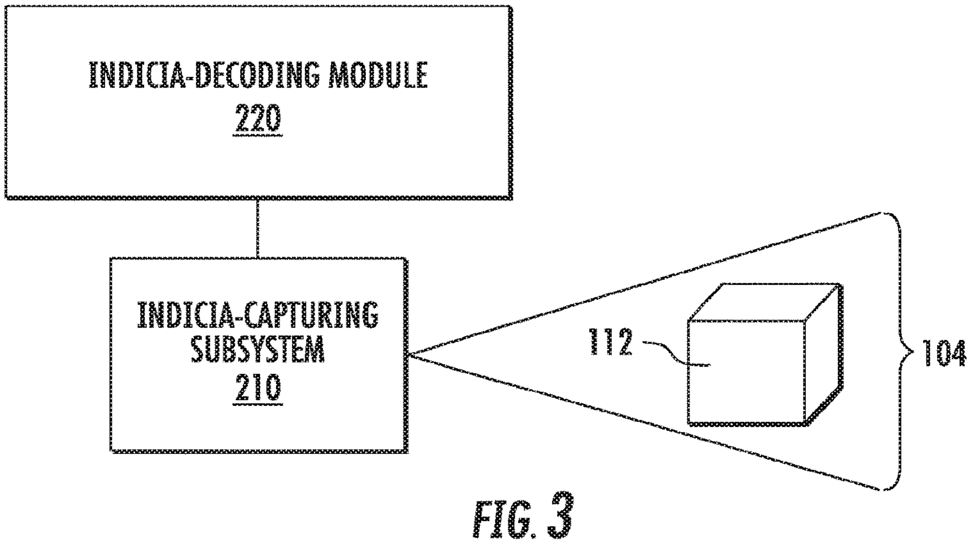
FIG. 3 is a schematic block diagram representative of a system design for the exemplary mountable indicia-reader.

The exemplary mountable indicia reader 100, when positioned in a fixed or mounted position (e.g., FIGS. 6 and 7), may operate in a pass-through scanning mode whereby objects 112 bearing indicia are passed within a field of view 104 to activate an indicia reading system, for example, as generally depicted schematically at FIG. 3. The exemplary reader 100, when positioned in a fixed or mounted position, may also operate in a presentation scanning mode whereby placing objects into an activation range of infrared (IR) sensor 105 (FIG. 1) activates an indicia reading system to capture or scan indicia within a field of view 104, decode the indicia, and send relevant data (e.g., via connector 600).

The reader 100 could also be configured for manual activation or operation, such that a manually-actuated button or other user-interface mechanism (e.g., keyboard, trigger, etc.) may be utilized to activate an indicia reading system (not explicitly shown).

The exemplary indicia reader, in this case a mountable, fixed-position reader 100, has an indicia reading system that includes an indicia-capturing system 210, as depicted at FIG. 3. The indicia-capturing system 210 acquires information about indicia within its field of view 104. Typically, the indicia reader 100 is mounted on a surface and functions in an automatic mode (e.g., presentation mode) whereby an object 112 that bears an indicium may be placed within the field of view 104 of the indicia-capturing system 210. The indicia reader 100, however, could also be utilized in a handheld mode where the indicia-capturing system 210 may be manipulated to reposition the field of view 104 to include the object 112 bearing the indicium.

In some instances, the indicia-capturing system 210 may be a laser-based system that sweeps a light beam (e.g., a laser beam) across the field of view 104 and then receives the optical signals that reflect or scatter off the indicium. Typically, the optical signal is received using a photoreceptor (e.g., photodiode) and is converted into an electrical signal. The electrical signal is an electronic representation of the indicia information (e.g., the data represented by the indicia). When in the form of an electrical signal, this information can be processed (e.g., decoded).

The indicia-decoding module 220 is configured to decode indicia information (e.g., electrical signal or digital image) acquired by the indicia-capturing subsystem 210. Although the indicia reader 100 has been described as including an indicia-decoding module 220 as shown, this is only by way of example. In other contemplated embodiments, the indicia-reader 100 may include an indicia-capturing system 210 and transmit the acquired optical information for processing or decoding at an external host or similar system (e.g., via connector 600). References contained herein to electrical signals are intended broadly to also encompass digital images capable of being electronically processed (e.g., an image-processing computer processor).

Figure 4:
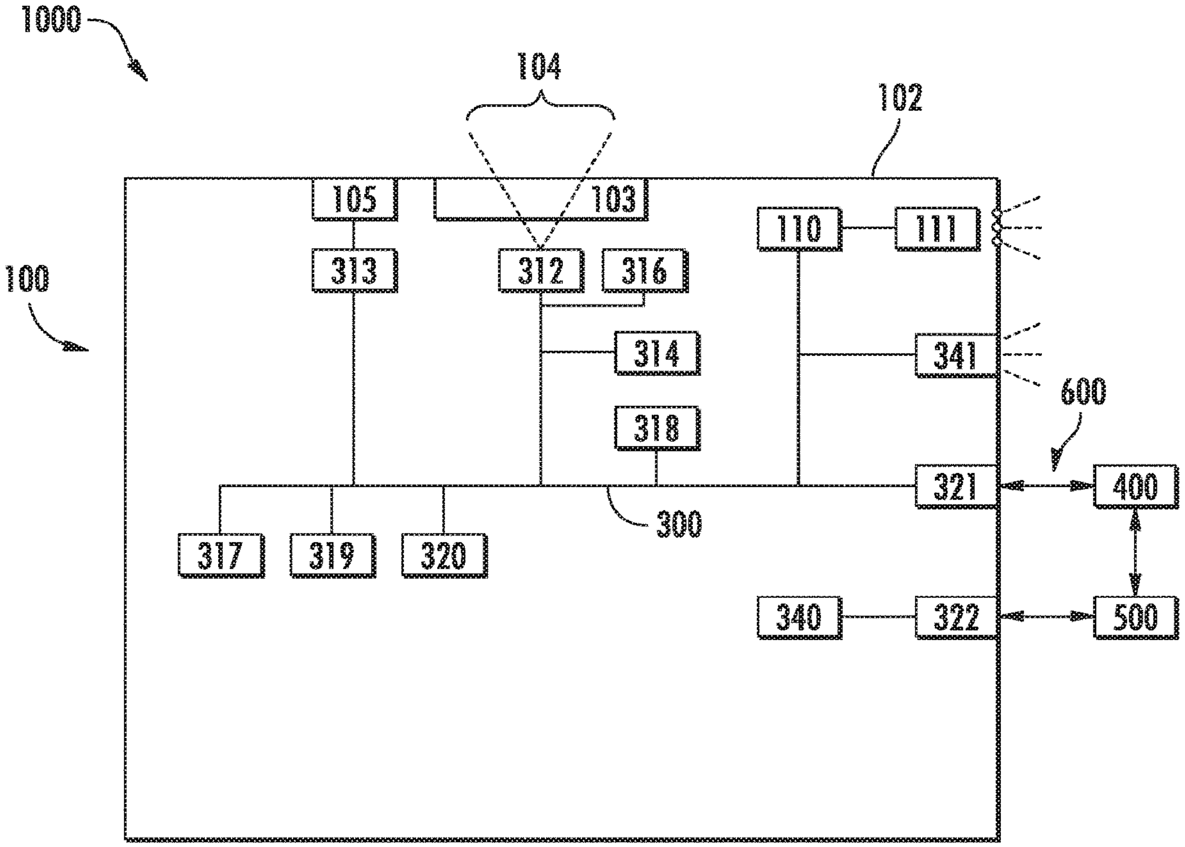
FIG. 4 is a schematic block diagram representative of an exemplary indicia-reading system including an exemplary mountable indicia-reader.

FIG. 4 is a schematic block diagram representing various exemplary subsystems or components of an exemplary indicia-reading system 1000, and which includes the systems of indicia reader 100 as generally depicted schematically and described with respect to FIG. 3. Although FIG. 4 includes schematic representations of components for an image-sensor based reader 100, as noted above the exemplary indicia reader 100 may alternatively (or in addition) include a laser-based scanning arrangement. With reference to FIG. 4, a border illustrates housing 102 with the exemplary components depicted as positioned within the border being components disposed, at least partially, within housing 102.

The exemplary indicia-reading system 1000 of FIG. 4 includes an image formation and detection mechanism (IFD) 312 (i.e., a camera) having imaging optics for producing a field of view 104. The camera 312 may include an area-type image detection array for detecting imaged light reflected off an object (e.g., object 112 as shown at FIG. 3).

Further, the exemplary indicia-reading system 1000 includes an illumination system 316 (e.g., having one or more LEDs) for producing illumination within the field of view 104. The emitted illumination may be transmitted through a narrow-band transmission-type optical filter.

An object detection subsystem 313 is in operative communication with IR sensor 105 for producing an IR-based object detection field (e.g., for activating an indicia reading system when objects are passed within the detection field).

A communication assembly 321 is configured for receiving input and for outputting processed image data and related information to an external host computer 400 or other device (e.g., via a wired or wireless connection). For example, the communication assembly 321 may transmit/receive data via connector 600.

Each respective subsystem of the exemplary indicia-reading device 100 may be operatively interfaced via a controller 314, and the components coupled to a system bus 300.

As shown, the exemplary indicia-reading device 100 includes an audio indicator system 110 including a sound source 111 for providing information to a user relating to the present status and/or the various operations of the indicia reader (e.g., failure indications, entering a different mode, completing a successful scan, etc.). Further, illumination of an indicator light (e.g., an LED) of the housing 102 from illumination indicator system 341 may be provided as a status indicator relating to reader operations.

Referring to further aspects of the exemplary indicia reading system 1000, the exemplary mountable indicia reader 100 can include a central processing unit (CPU) 318 for processing digital signals output by the camera 312 or other/additional light sensing assemblies. The indicia reader 100 may also include random access memory (RAM) 217, a read only memory 219, and a storage memory 220 (e.g., flash memory, a hard drive, etc.).

For attempting to decode indicia information, CPU 318 can process digital signal image data. The data corresponds to a line of pixel positions (e.g., a row, a column, or a diagonal set of pixel positions) in the case of an image-sensor-array-based light sensing assembly of FIG. 4. Otherwise, a digital signal representing an indicium can correspond to a scan path in the case of a laser-scanning-based light sensing assembly to determine a spatial pattern of dark and light cells. The CPU 218 can convert each light and dark cell pattern determined into a character or character string via table lookup.

In other contemplated embodiments, the indicia-reader 100 may capture and transmit the acquired optical information for processing or decoding at an external host or similar system (e.g., via a wired or wireless connection).

Where a decodable indicia representation is, for example, a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Regarding CPU 318, CPU 318 may run an operating system (OS) and a plurality of applicable device drivers via a communication interface 321.

Indicia reader 100 can include a power supply 322 that supplies power to a power grid 340 to which the internal electrical components (e.g., integrated circuits) can be connected. Power supply 322 can be coupled to internal or external power sources 500; e.g. a battery, a serial interface (e.g., USB RS232), and/or an AC/DC transformer.

Figure 5:
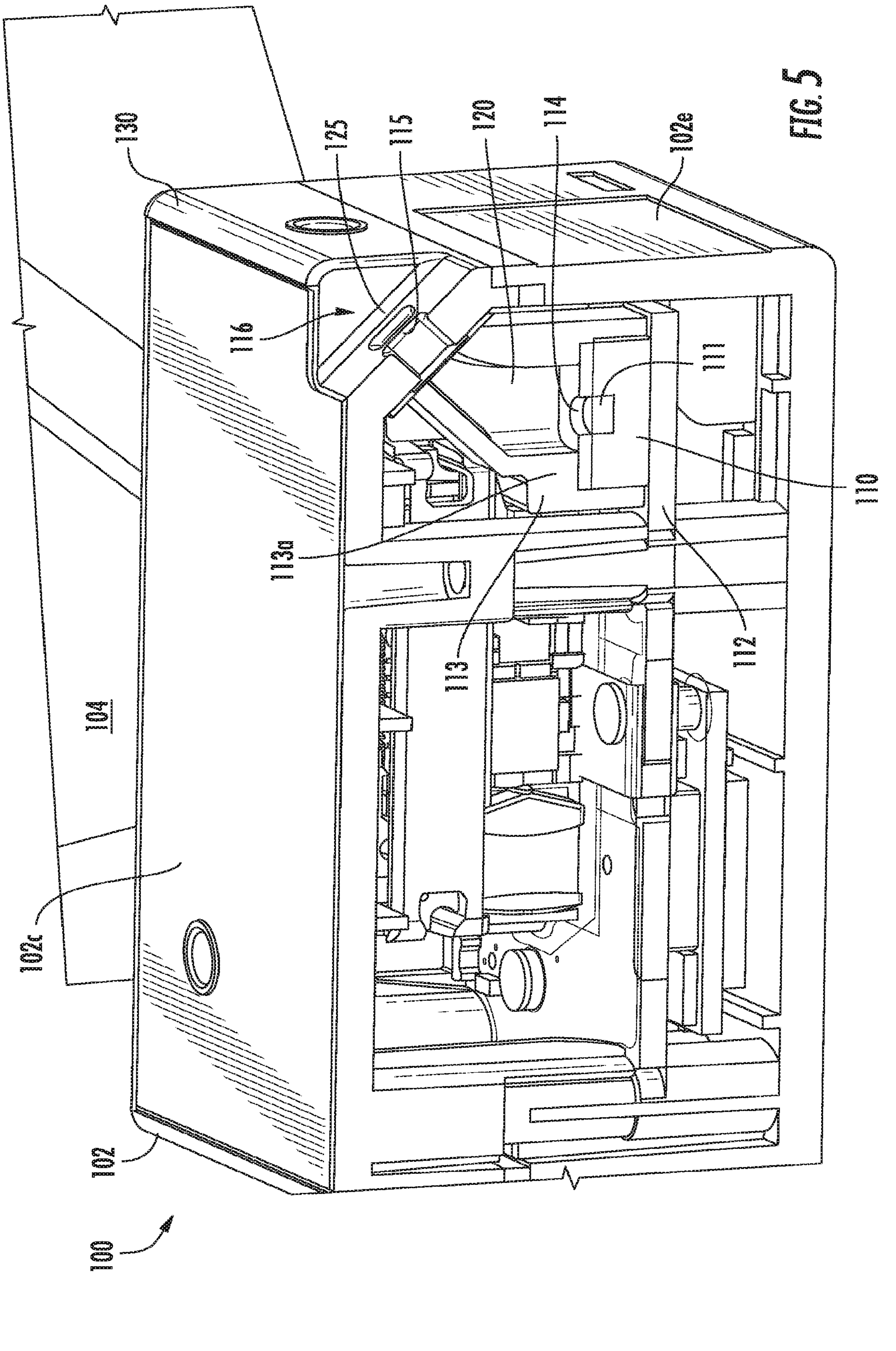
FIG. 5 is a rear perspective internal view depicting the exemplary mountable indicia-reader.

FIG. 5 is a rear-perspective internal view (i.e., a cutaway view) of the exemplary mountable reader 100. FIG. 5 illustrates the acoustic structure and related features of the exemplary housing 102. An audio indicator system 110 including a sound source 111 is disposed within the housing and positioned on a substrate 112 (e.g., an integrated circuit board). The audio indicator system 110 is configured and arranged for providing information to a user relating to the present status and/or the various operations of the indicia reader, for example, by emitting a tone after completion of a successful scan.

A chamber component 113 within the housing is shown enclosing portions of the audio indicator system 110 and surrounding the sound source 111. For example, the chamber may include a recess 113*a* forming an interference or snap fit onto a section of the audio indicator system 110 protruding from the substrate 112 in order to mate with the substrate 112. The chamber may be formed via injection molding of a durable rubber or elastomeric material.

As shown, the chamber 113 forms a sound conducting channel 120 (e.g., an acoustic-waveguide, sound conducting conduit, etc.) spanning from first end 114 about the sound source 111 to a second end 115 about the sound port openings 116. Thus, the sound conducting channel 120 is in acoustically communication with the sound port opening 116 for communicating audible indications emitted via the audio indicator system 110 to a user.

As depicted in the drawings, the exemplary housing 102 has substantially rectangular appearance, generally a rectangular box or prism, notwithstanding the connector 600 features and slightly rounded edges (e.g., for ease of use and handling). The sound port segment 125 (e.g., including the sound port openings 116 or beeper holes) is positioned within a void space along an edge 130 where two adjacent surfaces 102*c*, 102*e* meet. In this regard, the sound port segment 125 is inset, extending inward with regard to the outer portion of the adjacent edge 130.

As depicted, the sound port openings 116 are formed within a beveled portion or segment 125 of the common edge 130 joining the two adjacent mounting surfaces 102*c*, 102*e* of the housing 102. Thus, even though the sound source 111 of the audio indicator system 110 may comprise a single speaker, beeper, or other sound emitting mechanism, the acoustic housing 102 can provide sound indications to a user when mounted on either of the two adjacent mounting surfaces 102*c*, 102*e* in various mounted positions (e.g., at least two different mounting positions).

FIGS. 6 and 7, respectively, show the exemplary fixed-position reader 100 mounted onto a supporting surface 140 about the left-side surface 102*e* (FIG. 6) and the bottom surface 102*c* (FIG. 7). As illustrated, the sound ports 116 are not being blocked by the mounting surface 140 in either arrangement. Thus, audio signals emitted from the sound source 111 are effectively conducted through the channel acoustic structure 120 (FIG. 5) and transmitted through the sound ports 116 formed in the indicia reader housing 102 at recessed segment 125, therefore increasing the sound projection and/or the ability of a user to perceive the audible indications.

As shown and described herein, the exemplary acoustic housing for a fixed-position indicia reader includes a sound channel and sound ports formed about recessed or inset segment joining two adjacent mounting surfaces of the housing. Accordingly, even when the sound source comprises a single emitter (e.g., a beeper or speaker), the fixed-position indicia reader can transmit audible indications to a user when the indicia reader is mounted to a support surface on either of the two adjacent mounting surfaces without the sound being blocked by the support surface.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. Pat. No. D702,237; U.S. Pat. Nos. 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032; U.S. Design Pat. No. D716,285;

U.S. Design Pat. No. D723,560; U.S. Design Pat. No. D730,357; U.S. Design Pat. No. D730,901; U.S. Design Pat. No. D730,902; U.S. Design Pat. No. D733,112; U.S. Design Pat. No. D734,339; International Publication No. 2013/163789; International Publication No. 2013/173985; International Publication No. 2014/019130; International Publication No. 2014/110495; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0287258; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0342717; U.S. Patent Application Publication No. 2014/0001267; U.S. Patent Application Publication No. 2014/0008439; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0078341; U.S. Patent Application Publication No. 2014/0078345; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0104451; U.S. Patent Application Publication No. 2014/0106594; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0114530; U.S. Patent Application Publication No. 2014/0124577; U.S. Patent Application Publication No. 2014/0124579; U.S. Patent Application Publication No. 2014/0125842; U.S. Patent Application Publication No. 2014/0125853; U.S. Patent Application Publication No. 2014/0125999; U.S. Patent Application Publication No. 2014/0129378; U.S. Patent Application Publication No. 2014/0131438; U.S. Patent Application Publication No. 2014/0131441; U.S. Patent Application Publication No. 2014/0131443; U.S. Patent Application Publication No. 2014/0131444; U.S. Patent Application Publication No. 2014/0131445; U.S. Patent Application Publication No. 2014/0131448; U.S. Patent Application Publication No. 2014/0133379; U.S. Patent Application Publication No. 2014/0136208; U.S. Patent Application Publication No. 2014/0140585; U.S. Patent Application Publication No. 2014/0151453; U.S. Patent Application Publication No. 2014/0152882; U.S. Patent Application Publication No. 2014/0158770; U.S. Patent Application Publication No. 2014/0159869; U.S. Patent Application Publication No. 2014/0166755; U.S. Patent Application Publication No. 2014/0166759; U.S. Patent Application Publication No. 2014/0168787; U.S. Patent Application Publication No. 2014/0175165; U.S. Patent Application Publication No. 2014/0175172; U.S. Patent Application Publication No. 2014/0191644; U.S. Patent Application Publication No. 2014/0191913; U.S. Patent Application Publication No. 2014/0197238; U.S. Patent Application Publication No. 2014/0197239; U.S. Patent Application Publication No. 2014/0197304; U.S. Patent Application Publication No. 2014/0214631; U.S. Patent Application Publication No. 2014/0217166; U.S. Patent Application Publication No. 2014/0217180; U.S. Patent Application Publication No. 2014/0231500; U.S. Patent Application Publication No. 2014/0232930; U.S. Patent Application Publication No. 2014/0247315; U.S. Patent Application Publication No. 2014/0263493; U.S. Patent Application Publication No. 2014/0263645; U.S. Patent Application Publication No. 2014/0267609; U.S. Patent Application Publication No. 2014/0270196; U.S. Patent Application Publication No. 2014/0270229; U.S. Patent Application Publication No. 2014/0278387; U.S. Patent Application Publication No. 2014/0278391; U.S. Patent Application Publication No. 2014/0282210; U.S. Patent Application Publication No. 2014/0284384; U.S. Patent Application Publication No. 2014/0288933; U.S. Patent Application Publication No. 2014/0297058; U.S. Patent Application Publication No. 2014/0299665; U.S. Patent Application Publication No. 2014/0312121; U.S. Patent Application Publication No. 2014/0319220; U.S. Patent Application Publication No. 2014/0319221; U.S. Patent Application Publication No. 2014/0326787; U.S. Patent Application Publication No. 2014/0332590; U.S. Patent Application Publication No. 2014/0344943; U.S. Patent Application Publication No. 2014/0346233; U.S. Patent Application Publication No. 2014/0351317; U.S. Patent Application Publication No. 2014/0353373; U.S. Patent Application Publication No. 2014/0361073; U.S. Patent Application Publication No. 2014/0361082; U.S. Patent Application Publication No. 2014/0362184; U.S. Patent Application Publication No. 2014/0363015; U.S. Patent Application Publication No. 2014/0369511; U.S. Patent Application Publication No. 2014/0374483; U.S. Patent Application Publication No. 2014/0374485; U.S. Patent Application Publication No. 2015/0001301; U.S. Patent Application Publication No. 2015/0001304; U.S. Patent Application Publication No. 2015/0003673; U.S. Patent Application Publication No. 2015/0009338; U.S. Patent Application Publication No. 2015/0009610; U.S. Patent Application Publication No. 2015/0014416; U.S. Patent Application Publication No. 2015/0021397; U.S. Patent Application Publication No. 2015/0028102; U.S. Patent Application Publication No. 2015/0028103; U.S. Patent Application Publication No. 2015/0028104; U.S. Patent Application Publication No. 2015/0029002; U.S. Patent Application Publication No. 2015/0032709; U.S. Patent Application Publication No. 2015/0039309; U.S. Patent Application Publication No. 2015/0039878; U.S. Patent Application Publication No. 2015/0040378; U.S. Patent Application Publication No. 2015/0048168; U.S. Patent Application Publication No. 2015/0049347; U.S. Patent Application Publication No. 2015/0051992; U.S. Patent Application Publication No. 2015/0053766; U.S. Patent Application Publication No. 2015/0053768; U.S. Patent Application Publication No. 2015/0053769; U.S. Patent Application Publication No. 2015/0060544; U.S. Patent Application Publication No. 2015/0062366; U.S. Patent Application Publication No. 2015/0063215; U.S. Patent Application Publication No. 2015/0063676; U.S. Patent Application Publication No. 2015/0069130; U.S. Patent Application Publication No. 2015/0071819; U.S. Patent Application Publication No. 2015/0083800; U.S. Patent Application Publication No. 2015/0086114; U.S. Patent Application Publication No. 2015/0088522; U.S. Patent Application Publication No. 2015/0096872; U.S. Patent Application Publication No. 2015/0099557; U.S. Patent Application Publication No. 2015/0100196; U.S. Patent Application Publication No. 2015/0102109; U.S. Patent Application Publication No. 2015/0115035; U.S. Patent Application Publication No. 2015/0127791; U.S. Patent Application Publication No. 2015/0128116; U.S. Patent Application Publication No. 2015/0129659; U.S. Patent Application Publication No. 2015/0133047; U.S. Patent Application Publication No. 2015/0134470; U.S. Patent Application Publication No. 2015/0136851; U.S. Patent Application Publication No. 2015/0136854; U.S. Patent Application Publication No. 2015/0142492; U.S. Patent Application Publication No. 2015/0144692; U.S. Patent Application Publication No. 2015/0144698; U.S. Patent Application Publication No. 2015/0144701; U.S. Patent Application Publication No. 2015/0149946; U.S. Patent Application Publication No. 2015/0161429; U.S. Patent Application Publication No. 2015/0169925; U.S. Patent Application Publication No. 2015/0169929; U.S. Patent Application Publication No. 2015/0178523; U.S. Patent Application Publication No. 2015/0178534; U.S. Patent Application Publication No. 2015/0178535; U.S. Patent Application Publication No. 2015/0178536; U.S. Patent Application Publication No. 2015/0178537; U.S. Patent Application Publication No. 2015/0181093; U.S. Patent Application Publication No. 2015/0181109; U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);
U.S. patent application Ser. No. 29/519,017 for SCANNER filed Mar. 2, 2015 (Zhou et al.);
U.S. patent application Ser. No. 14/405,278 for DESIGN PATTERN FOR SECURE STORE filed Mar. 9, 2015 (Zhu et al.);
U.S. patent application Ser. No. 14/660,970 for DECODABLE INDICIA READING TERMINAL WITH COMBINED ILLUMINATION filed Mar. 18, 2015 (Kearney et al.);
U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);
U.S. patent application Ser. No. 14/662,922 for MULTIFUNCTION POINT OF SALE SYSTEM filed Mar. 19, 2015 (Van Horn et al.);
U.S. patent application Ser. No. 14/663,638 for VEHICLE MOUNT COMPUTER WITH CONFIGURABLE IGNITION SWITCH BEHAVIOR filed Mar. 20, 2015 (Davis et al.);
U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);
U.S. patent application Ser. No. 14/669,280 for TRANSFORMING COMPONENTS OF A WEB PAGE TO VOICE PROMPTS filed Mar. 26, 2015 (Funyak et al.);
U.S. patent application Ser. No. 14/674,329 for AIMER FOR BARCODE SCANNING filed Mar. 31, 2015 (Bidwell);
U.S. patent application Ser. No. 14/676,109 for INDICIA READER filed Apr. 1, 2015 (Huck);
U.S. patent application Ser. No. 14/676,327 for DEVICE MANAGEMENT PROXY FOR SECURE DEVICES filed Apr. 1, 2015 (Yeakley et al.);
U.S. patent application Ser. No. 14/676,898 for NAVIGATION SYSTEM CONFIGURED TO INTEGRATE MOTION SENSING DEVICE INPUTS filed Apr. 2, 2015 (Showering);
U.S. patent application Ser. No. 14/679,275 for DIMENSIONING SYSTEM CALIBRATION SYSTEMS AND METHODS filed Apr. 6, 2015 (Laffargue et al.);
U.S. patent application Ser. No. 29/523,098 for HANDLE FOR A TABLET COMPUTER filed Apr. 7, 2015 (Bidwell et al.);
U.S. patent application Ser. No. 14/682,615 for SYSTEM AND METHOD FOR POWER MANAGEMENT OF MOBILE DEVICES filed Apr. 9, 2015 (Murawski et al.);
U.S. patent application Ser. No. 14/686,822 for MULTIPLE PLATFORM SUPPORT SYSTEM AND METHOD filed Apr. 15, 2015 (Qu et al.);
U.S. patent application Ser. No. 14/687,289 for SYSTEM FOR COMMUNICATION VIA A PERIPHERAL HUB filed Apr. 15, 2015 (Kohtz et al.);
U.S. patent application Ser. No. 29/524,186 for SCANNER filed Apr. 17, 2015 (Zhou et al.);
U.S. patent application Ser. No. 14/695,364 for MEDICATION MANAGEMENT SYSTEM filed Apr. 24, 2015 (Sewell et al.);
U.S. patent application Ser. No. 14/695,923 for SECURE UNATTENDED NETWORK AUTHENTICATION filed Apr. 24, 2015 (Kubler et al.);
U.S. patent application Ser. No. 29/525,068 for TABLET COMPUTER WITH REMOVABLE SCANNING DEVICE filed Apr. 27, 2015 (Schulte et al.);
U.S. patent application Ser. No. 14/699,436 for SYMBOL READING SYSTEM HAVING PREDICTIVE DIAGNOSTICS filed Apr. 29, 2015 (Nahill et al.);
U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);
U.S. patent application Ser. No. 14/702,979 for TRACKING BATTERY CONDITIONS filed May 4, 2015 (Young et al.);
U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);
U.S. patent application Ser. No. 14/707,037 for SYSTEM AND METHOD FOR DISPLAY OF INFORMATION USING A VEHICLE-MOUNT COMPUTER filed May 8, 2015 (Chamberlin);
U.S. patent application Ser. No. 14/707,123 for APPLICATION INDEPENDENT DEX/UCS INTERFACE filed May 8, 2015 (Pape);
U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION READING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGUMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);
U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An apparatus comprising:

a housing comprising:

two adjacent mounting surfaces wherein the two adjacent mounting surfaces meet to form a common edge; and a sound conducting channel in acoustic communication with a sound source, wherein the sound conducting channel comprises a sound port opening formed within a beveled portion of the common edge, and wherein the sound port opening is recessed inward with respect to the common edge;

an indicia-capturing system at least partially enclosed within the housing; and an audio indicator system at least partially enclosed within the housing, the audio indicator system comprising the sound source, wherein the sound source is configured to provide audible indications based on the indicia-capturing system.

2. The apparatus of claim 1, wherein the housing is configured to be mounted in at least two different mounted positions by respectively attaching one or more of the two adjacent mounting surfaces to a support structure.

3. The apparatus of claim 1, wherein the indicia-capturing system is configured to acquire information about an indicia within a field of view of the indicia-capturing system.

4. The apparatus of claim 3, further comprising an indicia-decoding module at least partially enclosed within the housing.

5. The apparatus of claim 4, wherein the indicia-decoding module comprises a signal processor.

6. The apparatus of claim 1, wherein the sound conducting channel is configured to transmit the audible indications emitted via the sound source to the sound port opening when the housing is mounted in either of at least two different mounted positions.

7. The apparatus of claim 1, wherein the housing is substantially rectangular.

8. The apparatus of claim 7, wherein the sound source comprises a single beeper.

9. The apparatus of claim 8, wherein the sound conducting channel comprises a chamber that is positioned within the housing and at least partially enclosing the audio indicator system.

10. The apparatus of claim 9, wherein the chamber encloses the sound source and the sound conducting channel spans continuously to the sound port opening.

11. An apparatus comprising:

a housing, wherein the housing is configured to be mounted in at least two different mounted positions, the housing comprising:

two adjacent mounting surfaces, wherein the two adjacent mounting surfaces meet to form an edge; and a sound port opening that is recessed inward with respect to the edge, wherein in the sound port opening is in communication with a sound source that is configured to provide audible indications;

an indicia-capturing system at least partially enclosed within the housing, wherein the indicia-capturing system comprises an image formation and detection mechanism having imaging optics for producing a field of view;

an illumination system at least partially enclosed within the housing, wherein the illumination system is configured to produce illumination within the field of view; and a processor configured to process signals output by the indicia-capturing system and cause the sound source to provide the audible indications.

12. The apparatus of claim 11, wherein the housing is substantially rectangular.

13. The apparatus of claim 11, further comprising sound conducting channel, the sound conducting channel comprises a chamber that is positioned within the housing, wherein the chamber encloses the sound source and the sound conducting channel spans continuously to the sound port opening.

14. The apparatus of claim 11, wherein the sound port opening is configured to output the audible indications emitted when the housing is mounted in either of the at least two different mounted positions.

15. The apparatus of claim 11, wherein the processor is configured to decode the signals output by the indicia-capturing system.

16. A fixed-position indicia reader, comprising:

an indicia-capturing system for acquiring information about indicia presented within the indicia-capturing system a field of view of the indicia-capturing system;

an audio indicator system for providing audible indications relating to indicia reader operations, the audio indicator system having a sound source comprising a single beeper; and a housing for supporting and at least partially enclosing the indicia-capturing system and the audio indicator system, the housing comprising:

two adjacent mounting surfaces wherein the two adjacent mounting surfaces meet to form a common edge; and a sound port opening formed within a portion of the common edge joining the two adjacent mounting surfaces, wherein the sound port opening is recessed inward with respect to the common edge.

17. The indicia reader of claim 16, wherein the housing is operatively mounted to the fixed-position indicia reader to a support structure in at least two different mounting positions by respectively attaching one or more of the two adjacent mounting surfaces to the support structure.

18. The indicia reader of claim 17, wherein the sound port opening is in acoustic communication with the sound source and is configured to transmit the audible indications emitted from the sound source to the sound port opening when the housing is mounted in either of the at least two different mounting positions.

19. The indicia reader of claim 16, wherein the housing comprises an indicia-decoding module configured for decoding indicia information within the field of view of the indicia-capturing system, the indicia-decoding module comprising a signal processor.

20. The indicia reader of claim 16, wherein the sound port opening is in acoustic communication with the sound source via a sound conducting channel spanning continuously from the sound source to the sound port opening.

* * * * *